United States Patent [19]

Tipton

[11] Patent Number: 4,593,752

[45] Date of Patent: Jun. 10, 1986

[54] COMBINED REFRIGERATED AND HEATED FOOD SERVICE TABLE

[75] Inventor: Larry J. Tipton, Florissant, Mo.

[73] Assignee: Hussmann Corporation, Bridgeton, Mo.

[21] Appl. No.: 639,508

[22] Filed: Aug. 10, 1984

[51] Int. Cl.⁴ .................. F25B 29/00; F25B 43/00; B60H 1/32

[52] U.S. Cl. .................. 165/48.1; 165/61; 165/63; 62/228.3; 62/503

[58] Field of Search .................. 165/61, DIG. 25, 12, 165/63, 64, 27, 48.1; 62/228.3, 276, 503, 351, 275; 219/518; 126/33, 369

[56] References Cited

U.S. PATENT DOCUMENTS

| | | | |
|---|---|---|---|
| 2,471,420 | 5/1949 | Elkin | 126/33 |
| 2,504,794 | 4/1950 | Berman et al. | 165/12 |
| 2,783,621 | 3/1957 | Staebler et al. | 62/503 |
| 2,882,698 | 4/1959 | Boyle | 62/503 |
| 3,180,567 | 4/1965 | Quiggle et al. | 62/503 |
| 3,242,980 | 3/1966 | Bemiss et al. | |
| 3,255,812 | 6/1966 | Bayane et al. | |
| 3,283,524 | 11/1966 | Byron | 62/503 |
| 3,308,633 | 3/1967 | Kritzer, Jr. | |
| 3,353,476 | 11/1967 | Goodman et al. | 165/12 |
| 3,481,154 | 12/1969 | Johnson | |
| 3,483,714 | 12/1969 | Krause et al. | 62/503 |
| 3,516,485 | 6/1970 | Rhoads et al. | 165/64 |
| 3,600,904 | 8/1971 | Tilney | 62/503 |
| 3,631,685 | 1/1972 | Young | 62/228.3 |
| 3,736,981 | 6/1973 | Shevlin | 165/DIG. 25 |
| 4,087,987 | 5/1978 | Schumacher et al. | 62/276 |
| 4,123,919 | 11/1978 | Fehlhaber | 62/503 |
| 4,250,959 | 2/1981 | Spasojevic | |
| 4,460,822 | 7/1984 | Alden et al. | 126/369 |

Primary Examiner—William R. Cline
Assistant Examiner—John K. Ford
Attorney, Agent, or Firm—Sixbey, Friedman & Leedom

[57] ABSTRACT

A food service table (10) is provided which includes separate heating and cooling systems enclosed within a housing (12) which may be selectively activated to heat or to cool food displayed and served on the table. Substantially all of the upper surface (13) of the housing (12) includes a food service area (14) in which is mounted a food service pan (24). Heating elements (26) and cooling coils (42) mounted on the pan (24) heat or cool foods displayed in the pan. The cooling system includes accumulator means (34) positioned at the lowest level of the cooling system for receiving and collecting refrigerant fluid upon activation of the heating system. Control means are provided to control the expansion and flow of refrigerant fluid during operation of the heating system.

17 Claims, 5 Drawing Figures

COMBINED REFRIGERATED AND HEATED FOOD SERVICE TABLE

DESCRIPTION

1. Technical Field

The present invention relates generally to food servicing equipment and, in particular, to a food service table for serving and displaying either hot or cold foods.

2. Background Art

Restaurants and other types of food service facilities commonly employ heated and cooled food service tables to ensure that the foods they serve are maintained at appropriate serving temperatures. Large food service facilities, such as cafeterias, usually offer a variety of hot and cold foods at each meal and can physically accommodate and economically justify food service tables which can be used for either only hot foods or only cold foods. However, smaller self-service operations, like those of many restaurants, can offer only a limited selection of foods and may not have either the space or the need for separate food service tables for hot and cold foods. For example, a restaurant may wish to offer a self-service buffet or smorgasbord type of breakfast meal for which the food to be served must be kept hot and a salad bar at other meals for which the food to be served must be kept cold. In order to be able to provide these foods to its patrons on a self-service basis, the restaurant would be required to have either two separate food service tables, one for hot foods and one for cold foods or a single table of the type described in U.S. Pat. No. 3,308,633 by Kritzer which has separate sections for hot and cold foods. Such a table, however, would be only partially used at each meal, depending upon whether hot or cold foods were to be served, and would be inefficient and uneconomical for the type of small self-service food operation just described.

None of the food service tables currently available or disclosed by the prior art provides, alternatively a heating or a cooling capability so that a single food service table can be used as either a hot table or a cold table. Prior art food service tables which may be used to keep foods either hot or cold typically provide simultaneous heating and cooling capability for the table so that both hot foods and cold foods may be served at the same time. Such systems are illustrated in U.S. Pat. Nos. 3,242,980 to Bemiss et al 3,255,812 to Bayane et at 3,308,633 to Kritzer; 3,481,154 to Johnson and 4,250,959 to Spasojevic. The heating and cooling functions of the food service tables described in these references are performed by two separate systems which must be kept physically isolated from each other to function efficiently since the heat produced by the heating system will adversely affect the refrigerant used for the cooling system. Consequently, the cabinet portion of the table which houses the heating and cooling equipment must be large enough to contain both systems as well as some type of insulated barrier between them to prevent undesirable increases in the temperature of the cooling equipment and refrigerant. Such an arrangement can result in considerable unusable food serving space on the table surface and can add significantly to the size and weight of the table. In addition, these prior art tables are not well suited for use in a small restaurant environment where it is desired to offer a wide selection of either all hot or all cold foods at different times during the day.

The prior art, therefore, fails to disclose a compact efficient food service table having a heating capability and a cooling capability which permits, alternatively, display and service of hot or cold foods.

DISCLOSURE OF THE INVENTION

It is a primary object of the present invention to provide a compact and efficient food service table which may be used to serve and display alternatively, either hot or cold foods.

It is another object of the present invention to provide a food service table including both a heating system and a cooling system arranged so that either system may be selectively activated as needed to provide hot food or cold food display and service capability.

It is still another object of the present invention to provide a food service table having both a heating system and a cooling system including means which permits the table to be rapidly and efficiently changed from a heating table to a cooling table and back to a heating table.

It is a further object of the present invention to provide a dual function heating and cooling food service table with a cooling system which includes structure for accumulating substantially all of the refrigerant fluid while the food service table is functioning as a heating table so that deleterious increases in the pressure of the refrigerant fluid and damage to the cooling system are avoided.

It is yet a further object of the present invention to provide a food service table including means which prevents activation of the cooling system under conditions which would damage the cooling system.

The aforementioned objects are achieved by providing a food service table including both an efficient heating system and an efficient cooling system which can be selectively activated so that the table can be employed either as a heating table for the service of foods which must be kept hot or as a cooling table for the service of foods which must be maintained at cool temperatures. The separate heating and cooling systems of the present invention are supported within a compact common housing which also supports containers and receptacles for displaying and serving food. The heating system includes heating element means secured to the food display and service structures, and the cooling system includes refrigeration tubes also secured to the food display and service structures. The cooling system further includes a refrigeration circuit with compressor means. Accumulator means are positioned at the lowest point within the cooling system refrigeration circuit to collect substantially all of the refrigerant from the system when the cooling system is deactivated and the heating system is activated. Sensor means in the refrigerant line prevents operation of the compressor when the temperature or the pressure reaches a predetermined level so that refrigerant is retained by the accumulator means until use of the food service table as a cooling table is desired and the cooling system is activated. The cooling system may additionally include pressure sensitive valve means positioned in the refrigeration circuit line which permits continued compressor operation following a switch from the cooling function to the heating function of the table to force refrigerant into the accumumulator means, thereby isolating it from the heating means. Also a water level sensor is provided to protect the heating unit during the heating function of the table.

BEST MODE FOR CARRYING OUT THE INVENTION

The present food service table permits the effective and efficient display and service of either hot or cold foods in a manner convenient to both the food service operator and the food service patron. Moreover, the arrangement of the heating and cooling systems allows maximum use to be made of the food display and service area of the table. The food service operator is further provided the flexibility of being able to offer foods of different temperatures at different times during the day with the present food service table without sacrificing a large amount of floor space.

Figure 1:
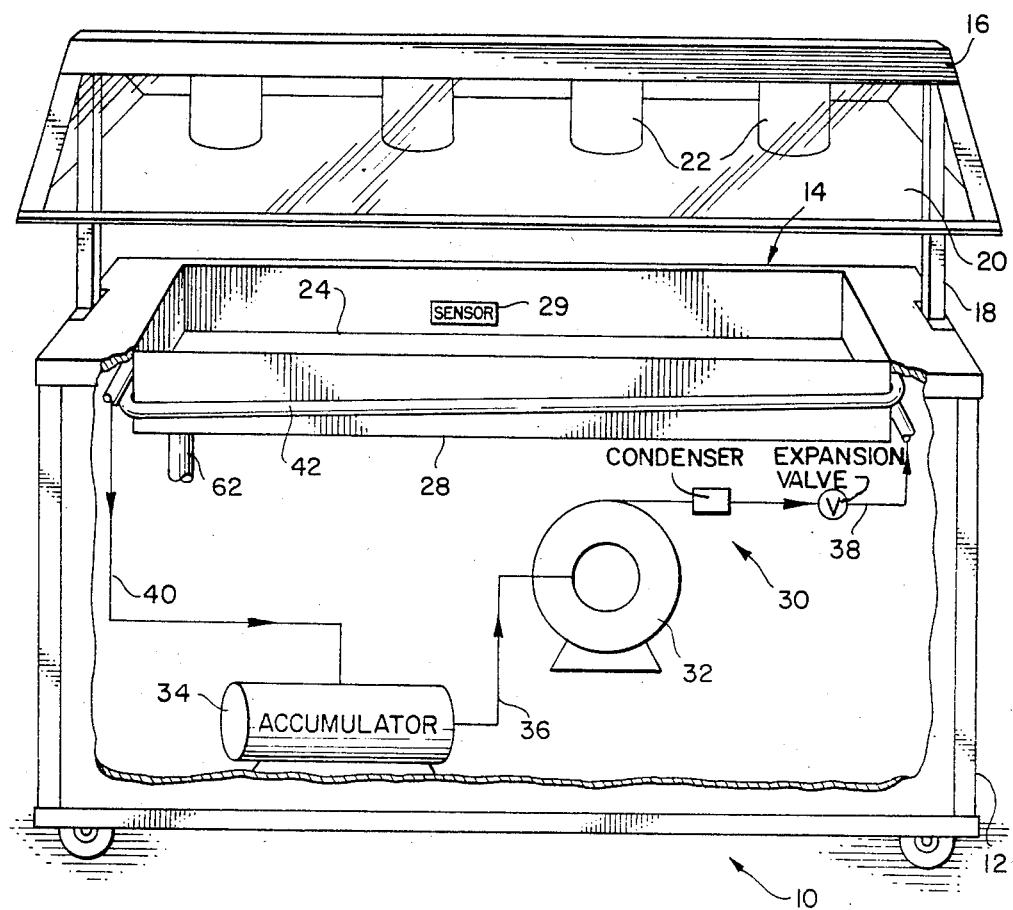
FIG. 1 is a perspective view of the food service table of the present invention including a schematic diagram of the basic cooling system.

Referring to the drawings, FIG. 1 shows the food service table of the present invention in perspective and includes the cooling system in schematic. Food service table 10 includes a housing 12 having a food display and service area 14 located in the upper portion of the housing. A canopy 16 mounted on supports 18 may be positioned above the food display and service area and may include such features as the "sneeze guard" 20 and lights 22 shown in FIG. 1. The food display and service area 14 preferably occupies substantially the entire upper side of the table housing to provide maximum food service capability. A receptacle, such as pan 24, which is formed of material which will conduct heat and cold, such as metal, is supported securely within the perimeter of the food service area. Pan 24 may be either removably or permanently supported by the upper portion of housing 12, and may be alternatively filled with water which is heated and kept hot by and electrical heating system, or the pan may be kept cool by an electrical cooling system. Food containers (not shown) specifically designed for serving hot foods are inserted into pan 24 when the table is used as a heating table and the contents of the pans are kept warm by the hot water in pan. Alternatively, pan 24 may be filled with containers (not shown) specifically designed for serving cold foods, such as salad greens and the like, which are kept at a proper serving temperature for cold foods.

Figure 2:
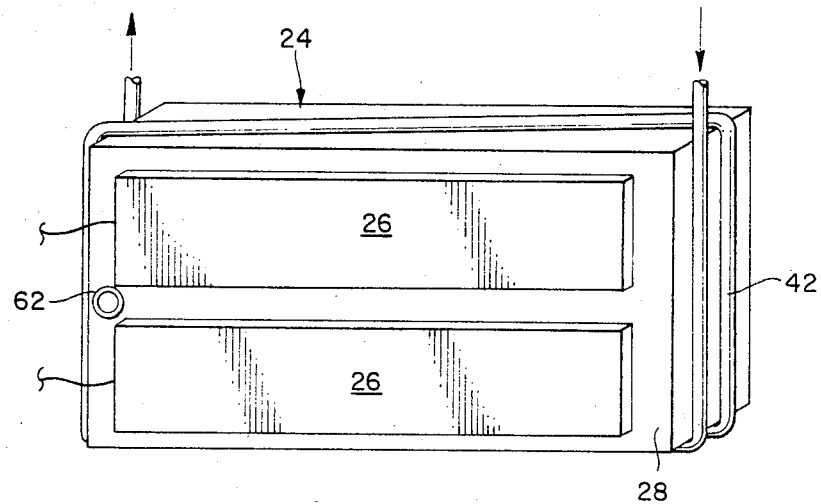
FIG. 2 is a perspective view of a food heating and cooling pan intended for use with the food service table of FIG. 1.

The heating system employed by the food service table of the present invention quickly and efficiently heats pan 24. This heating system includes heating elements 26 secured to pan 24 on the underside surface 28 of the pan so that the heating elements are contained within the food service table housing 12. Heating elements preferred for use with the present invention include pad-type silicone heaters. Such heaters are especially well suited to a combination heating and cooling food service table because their low mass heats up and cools down quickly, and they may be employed to heat a large surface area. The heating elements 26 are preferably adhesively bonded to surface 28 and covered with a water resistant coating material. Two heating elements 26 having a rectangular configuration are shown in FIG. 2. However, any number and configuration of heating elements which will effectively heat surface 28 to the proper temperature required for the particular hot foods to be served may also be used.

To protect the heating elements 26, a water level sensor 29 is mounted inside the pan 24 to sense the level of water within the pan. When the water level drops below a predetermined safe level, the water level sensor deenergizes the heating elements 26. The water level sensor 29 might constitute a float operated switch or any one of a number of known sensors which provide an electrical switching function when a fluid level drops below a predetermined point.

A cooling system 30 for the present food service table is completely contained within the table housing 12. Access to the system may be provided by doors, removable panels or the like, which are not shown in FIG. 1. As shown schematiclly in FIG. 1, the basic cooling system 30 includes a closed system refrigeration circuit through which a refrigerant fluid is pumped by a compressor 32. Other conventional refrigeration components, necessary for the operation of a conventional refrigeration circuit such as a condensor, are shown. A receiving tank or accumulator 34 is positioned within the refrigeration circuit at the lowest point in the circuit. Refrigerant lines 36, 38 and 40 provide the necessary fluid connections between the accumulator 34, the compressor 32 and a cooling element 42 secured to the pan 24. Cooling element 42 is shown to be a cooling coil mounted in heat exchange relationship with around the exterior side surfaces of the pan 24, but this coil could also be effectively mounted on the underside 28 of the pan.

It is important to note that the accumulator 34 is located at the lowest point in the refrigeration circuit, for this enables the present dual function heating and cooling table to operate both efficiently and effectively. A refrigerant fluid, such as Freon, is contained within the refrigeration circuit and circulates throughout the circuit. When control means (to be described) prevent the compressor from pumping the refrigerant fluid through the circuit, the refrigerant fluid will tend to seek the lowest point in the circuit, which is accumulator 34.

The relative locations of both heating elements 26 and cooling coils 42 on the pan 24 and the compact size of housing 12 results in the transfer of heat generated by the heating elements to the cooling coils, and therefore, it is critical that the refrigerant fluid be drained from the cooling coils so that heat is not imparted to the refrigerant fluid in the cooling system. Since the refrigerant fluids likely to be used in the present cooling system will expand upon heating, activation of the table heating system immediately following the deactivation of the cooling system could cause pressure surges created by the uncontrolled expansion of refrigerant fluid. Such pressure surges could seriously damage elements of the cooling system. The present invention, however, avoids this problem by providing accumulator 34 at the lowest point in the cooling system to thermally isolate the refrigerant fluid when the function of the food service table is changed from a cooling table to a heating table. Refrigerant fluid, assisted by gravitational forces, will flow out of the cooling coils to the lowest point in the system, which, in the instant cooling system, is into the accumulator 34, thus automatically emptying refrigerant from the cooling coils 42 and the other portions of the cooling system proximate to the heating system when flow from the compressor is terminated. Consequently, the heating system can be immediately activated when it is desired to change the present food service table from the service of cold food to the service of hot food.

Figure 3:
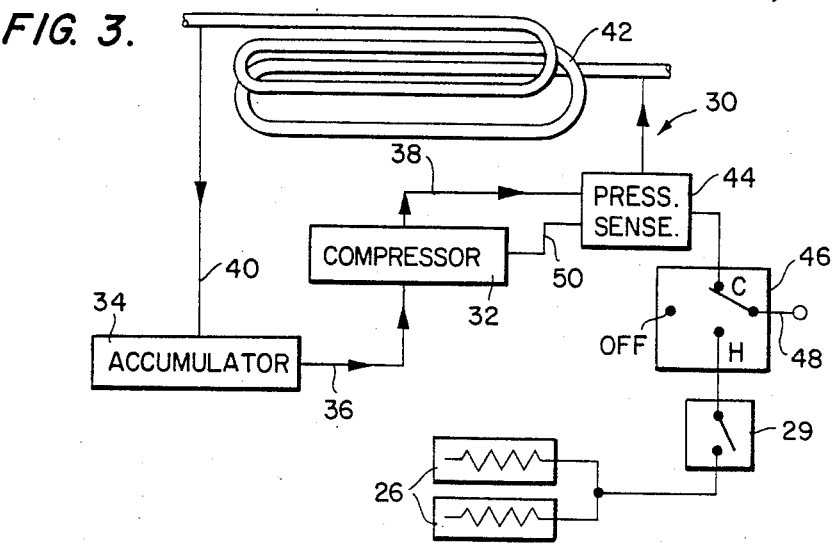
FIG. 3 is a schematic diagram of the electrical and fluid circuits for the food service table of the present invention.
Figure 4:
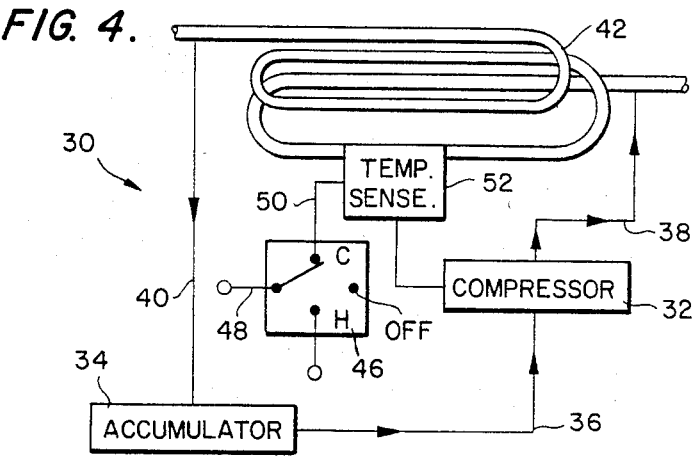
FIG. 4 is a schematic diagram of a second embodiment of electrical and fluid circuitry for the food service table of the present invention.
Figure 5:
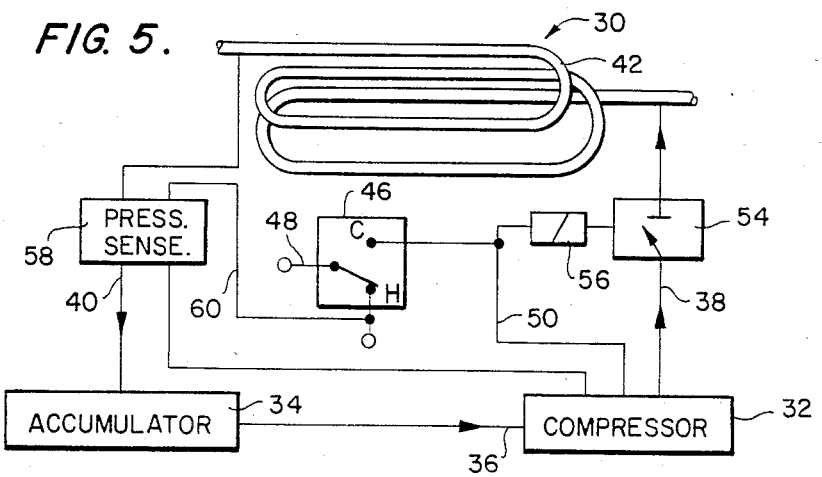
FIG. 5 is a scchematic diagram of a third embodiment of electrical and fluid circuitry for the food service table of the present invention.

Additional safety controls for controlling the flow of refrigerant fluid may be provided, as illustrated in FIGS. 3-5, to enhance the effective operation of the food service table 10. For example, if the pan 24 is to be cooled a short time after it has been heated, it is very important to insure that the pan and the cooling coils 42 have been cooled to a point where undesirable expansion of the refrigerant fluid is precluded. Thus a pressure sensing unit 44 (FIG. 3) is placed in the refrigerant line 38 between the compressor 32 and the cooling coils. This pressure sensing unit may constitute a simple pressure responsive valve which will close if refrigerant fluid pressure within the cooling coils exceeds a predetermined level. Thus, if the coils 42 are still hot when a control switch 46 is switched from the hot (H) to the cool (C) position to energize the compressor 32, the pressure responsive valve would close and prevent the compressor from providing additional refrigerant fluid to the cooling coils 42. Once the cooling coils cool to a degree where the pressure drops below the level necessary to close the pressure responsive valve, the pressure responsive valve will open to permit refrigerant fluid to flow from the compressor through the fluid circuit formed by the refrigerant line 38, the cooling coils 42, the refrigerant line 40, the accumulator 34, and the refrigerant line 36 back to the compressor.

If a pressure responsive valve is used as the pressure sensing unit 44, then power from an input terminal 48 would flow through the control switch 46 to directly energize the compressor 32. On the other hand, the pressure sensing unit 44 may constitute a pressure responsive switch instead of a valve. In this case, the pressure responsive switch would open the electrical circuit 50 between the control switch 46 and the compressor 32 when the pressure in the refrigerant line 38 and the cooling coils 42 is too high. This will prevent the compressor from being energized to pump refrigerant to the cooling coils until these coils have cooled to a point where undesirable expansion of the refrigerant fluid cannot occur. At this point, the pressure responsive switch will close to permit energization of the compressor.

Rather than a pressure sensing unit as shown in FIG. 3, the refrigerant circuit may be protected by a thermal sensing unit 52 as shown in FIG. 4. This thermal sensing unit may be mounted on the cooling coils 42 to sense the temperature thereof and to prevent operation of the compressor 32 when the temperature is high enough to cause undesirable expansion of the fluid refrigerant. For example, the thermal sensing unit 52 could constitute a bimetallic switch mounted to sense the temperature of the cooling coils 42 and operative to open and break the electrical circuit 50 to the compressor 32 when this temperature is too high. The thermal sensing unit 52 and the pressure sensing unit 44 will not allow the compressor to provide refrigerant to the cooling coils 42 when these coils are heated above a predetermined temperature; for example 110 degrees F.

For some applications, it may not be possible to position the accumulator 34 at the lowest point in the cooling system 30 so that the refrigerant fluid automatically drains into the accumulator when the compressor 32 is shut down, thereby making it necessary to pump the refrigerant fluid into the accumulator. It may even be desirable to physically draw the refrigerant fluid into the accumulator, even when the accumulator is the lowermost element in the cooling system, to insure that all refrigerant is out of the cooling coils 42 when these coils are heated. For this purpose, a normally closed solenoid valve 54 is inserted in the refrigerant line 38 between the compressor and the cooling coils. Normally, when the operating solenoid 56 for this solenoid valve is deenergized, the valve will block fluid flow from the compressor 32 to the cooling coils 42 as illustrated in FIG. 5. Energization of the solenoid 56 will open the valve to permit fluid refrigerant to flow from the compressor 32 into the cooling coils 42 and through the cooling system back to the compressor.

In the cooling system 30 of FIG. 5, when the control switch 46 is in the cool (C) position, power from the input terminal 48 is directed through the control switch to energize the solenoid 56 and through the electrical circuit 50 to energize the compressor 32. A pressure sensing switch 58 in the refrigerant line 40 closes in response to pressure in excess of a predetermined level in the line 40. When the control switch 46 is switched to the hot (H) position to provide power from the input terminal 48 to the heating elements 26, the compressor 32 will remain energized through an electrical circuit 60 if the pressure in the refrigerant line 40 is sufficient to maintain the pressure sensing switch 58 in the closed position. However, the solenoid 56 is now deenergized so the valve 54 blocks fluid refrigerant flow from the compressor to the cooling coils 42. The compressor will keep running until it draws the refrigerant from the cooling coils 42 into the accumulator 34, at which point, the pressure in the refrigerant line 40 will drop to a level where the pressure sensing switch 58 opens to shut down the compressor 32.

The electrical circuit 50 for the compressor 32 of FIG. 5 may include either the pressure sensing unit 44 of FIG. 3 or the thermal sensing unit 52 of FIG. 4. This combination provides very effective control of the cooling system 30.

In operation of the food service table 10, if the display and service of cold foods is desired, the cooling system 30 is switched on, which causes the compressor 32 to pump cold refrigerant fluid through the refrigerant circuit and into cooling coils 42 which then cause the temperature in the interior of pan 24 to drop. This pumping of refrigerant will be delayed by either the pressure sensing unit 44 or the thermal sensing unit 52 if the temperature of the cooling coils is above a predetermined safe limit.

When it is desired to switch from the service of cold foods to the service of hot foods, the pan 24 is filled with water and the food service operator activates those controls which turn the cooling system off and turn the heating system on. The heating elements 26 will then heat up and raise the temperature of the interior of pan 24, while the liquid refrigerant passes into the accumulator 34. The water in the pan will reach a suitable temperature for maintaining hot foods at a desirable serving temperature, and as long as the water level within the pan is sufficient, the water level sensor 29 will permit continued operation of heating elements 26. Before switching the food service table back to a cooling operation, a drain assembly 62 may be employed to empty the water from the pan 24.

INDUSTRIAL APPLICABILITY

The food service table of the present invention will find its primary application in self-service food facilities where it is desired to serve a variety of hot or cold foods in a minimum amount of floor space. The present food service table is particularly useful in a small food service operation such as a "fast food" type restaurant which typically has only a small amount of floor space and a small staff. The versatility, efficiency and flexibility of the present food service table can be employed to increase significantly the varieties of foods which can be offered at such a restaurant with little additional investment in cost and personnel time.

I claim:

1. A combination heated and refrigerated food service unit comprising:
   (a) a heat exchange food support means which is conductive of both heat and cold for supporting food to be either heated or cooled;
   (b) mounting means for said heat exchange support means,
   (c) refrigerant containing refrigeration circuit means having cooling coils mounted on said mounting means in direct heat exchange relationship with said food support means in a manner for cooling substantially the entire heat exchange food support means to thereby cool all food supported thereby,
   (d) heating means mounted on said mounting means in direct heat exchange relationship with said food support means in a manner for heating substantially the entire heat exchange food support means to thereby heat all food supported thereby to a hot food serving temperature,
   (e) control means connected to said refrigeration and heating circuit means to institute either the heating or cooling of said heat exchange food support means, and
   (f) accumulator means of a refrigerant capacity substantially equal to that of the refrigeration circuit means and situated at a low point of said refrigeration circuit means for thermal isolating the refrigerant in the said refrigeration circuit means from the heating effect of said heating means when said refrigeration circuit means is deactivated by emptying said cooling coils.

2. The combination heated and refrigerated food service unit of claim 1 wherein said accumulator means is located between said cooling coils and compressor means of said refrigeration circuit means.

3. The combination heated and refrigerated food service unit of claim 2 wherein said accumulator means is positioned at a level in said refrigeration circuit means which is below said cooling coils and said compressor means, and has a volume sufficient to enable complete emptying of refrigerant from said cooling coils.

4. The combination heated and refrigerated food service unit of claim 2 wherein said accumulator means is positioned to be out of heat transfer relationship with said heat exchange support means.

5. The combination heated and refrigerated food service unit of claim 3 wherein said heat exchange support means includes a liquid tight pan including a drain means for removing liquid from said pan.

6. The combination heated and refrigerated food service unit of claim 2 wherein said heat exchange support means includes an open topped pan having a bottom wall and side walls, said cooling coils extending around and being in direct heat exchange relationship with the side walls of said pan.

7. The combination heated and refrigerated food service unit of claim 6 wherein said heating means includes at least one heater unit mounted on the bottom wall of said pan.

8. The combination heated and refrigerated food service unit of claim 7 wherein said heater unit includes an electric heating pad secured to the bottom of said pan, said electric heating pad including a waterproof cover.

9. The combination heated and refrigerated food service unit of claim 2 which includes compressor control means for preventing compressor means operation when conditions in said refrigerant circuit means vary from predetermined values.

10. The combination heated and refrigerated food service unit of claim 9 wherein said compressor control means includes pressure sensor means responsive to the pressure of said refrigerant.

11. The combination heated and refrigerated food service unit of claim 9 wherein said compressor control means includes temperature sensor means responsive to the temperature of said refrigerant.

12. The combination heated and refrigerated food service unit of claim 2 which includes refrigerant flow control means for controlling the flow of refrigerant in said refrigerant circuit means, said refrigerant flow control means operating to cause said compressor means to pump refrigerant from said cooling coils to said accumulator means when the heating circuit means is activated while preventing said compressor means from pumping refrigerant to said cooling coils.

13. The combination heated and refrigerated food service unit of claim 12 wherein said refrigerant flow control means includes pressure sensitive means for sensing the pressure of refrigerant flowing between said cooling coils and said accumulator means and for deactivating said compressor means when the sensed pressure drops below a predetermined value.

14. A combination heated and refrigerated food service table comprising:
   (a) a housing unit,
   (b) an open topped food support pan having a bottom wall and side walls formed of material which is conductive of both heat and cold, said food support pan being operative to support food to be either heated or cooled and being mounted on an upper portion of said housing unit,
   (c) refrigerant containing refrigeration circuit means mounted on said housing unit and operative to cool substantially the entire food support pan to cool all food supported thereby, said refrigeration circuit means including cooling coils extending in direct heat exchange relationship with said food support pan, compressor means for pumping said refrigerant to said cooling coils and an accumulator means located between said cooling coils and said compressor means at a low point of said refrigeration circuit means, said accumulator means serving as a means for thermally isolating the refrigerant in said refrigeration circuit by emptying said cooling coils when the refrigeration circuit means is deactivated, (d) heating means mounted on said housing unit and operative to heat substantially the entire food support pan to heat all food supported thereby to a hot food service temperature, said heating circuit means including at least one heater unit mounted in direct heat exchange relationship with said food support pan, and (e) control means for said refrigeration and heating circuit means to institute either the heating or cooling of said food support pan.

15. The combination heated and refrigerated food service table of claim 14 which includes liquid level sensing means mounted within said food support pan to sense the level of liquid within said food support pan, said liquid level sensing means operating to deenergize said heating circuit means when the level of liquid within said food support pan drops below a predetermined level.

16. The combination heated and refrigerated food service table of claim 15 which includes compressor control means for preventing operation of said compressor means when conditions in said refrigeration circuit means vary from predetermined values.

17. The combination heated food service table of claim 16 wherein said accumulator means is positioned at a level in said refrigeration circuit means below said cooling means and said compressor means.

* * * * *